(12) United States Patent
Gosalia et al.

(10) Patent No.: US 11,470,141 B1
(45) Date of Patent: Oct. 11, 2022

(54) REMOTE DEVICE INFRASTRUCTURE

(71) Applicant: Browserstack Limited, Dublin (IE)

(72) Inventors: Dhimil Gosalia, Maharashtra (IN); Yohan Pereira, Maharashtra (IN)

( * ) Notice: Subject to any disclaimer, the term of this patent is extended or adjusted under 35 U.S.C. 154(b) by 0 days.

(21) Appl. No.: 17/590,812

(22) Filed: Feb. 1, 2022

(51) Int. Cl.
*H04L 65/80* (2022.01)
*H04L 65/1069* (2022.01)
*H04L 65/611* (2022.01)
*H04L 65/613* (2022.01)
*G06F 3/14* (2006.01)
*G06F 3/0484* (2022.01)

(52) U.S. Cl.
CPC .......... *H04L 65/80* (2013.01); *H04L 65/1069* (2013.01); *H04L 65/611* (2022.05); *H04L 65/613* (2022.05); *G06F 3/0484* (2013.01); *G06F 3/1454* (2013.01)

(58) Field of Classification Search
CPC .. G06F 11/3688; G06F 11/3668; G06F 11/36; G06F 11/2294; G06F 3/1454; G06F 3/0484; H04L 67/025; H04L 43/50; H04L 67/02
See application file for complete search history.

(56) References Cited

U.S. PATENT DOCUMENTS

2017/0300286 A1* 10/2017 Lieb ...................... G06F 3/1454
2018/0129519 A1*  5/2018 Bharadwaj .............. H04L 67/10
2018/0167426 A1*  6/2018 Sigurdsson ......... H04L 65/1069

FOREIGN PATENT DOCUMENTS

JP         2016212596 A  * 12/2016
KR       20190036671 A  *  4/2019

* cited by examiner

*Primary Examiner* — Caroline H Jahnige
(74) *Attorney, Agent, or Firm* — Cognition IP, P.C.; Edward Steakley; Saleh Kaihani

(57) ABSTRACT

Disclosed are systems and methods for enabling a developer to use a local browser, running on a local machine of the developer in a first location to access real devices (e.g., smart phones) at a second location, such as a data center. The developer can select and control the remote devices, in the second location. The described embodiments can capture developer's inputs from the first location and input them to the remote device in the second location. A video stream of the remote device is transmitted to the browser in the first location and displayed in a replica canvas on the developer's browser. The developer can interact with the canvas on his/her browser, as if the remote device were present in the first location.

20 Claims, 8 Drawing Sheets

REMOTE DEVICE INFRASTRUCTURE

BACKGROUND

Field

This invention relates generally to the field of enabling a remote device infrastructure for multiple remote hardware and software platforms, and more particularly to systems and methods for providing a seamless mirroring between a remote device and a developer's local machine.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The multitude of computers, mobile devices and platforms have given businesses and consumers a vast array of options when they choose a device. The plethora of choices include both hardware and software. Naturally, software, application and website developers have a keen interest in ensuring their products work seamlessly across the existing hardware and platforms, including older devices on the market. This creates a challenge for the developers to properly test their products on the potential devices and platforms that their target consumer might use. On the one hand, acquiring and configuring multiple potential target devices can strain the resources of a developer. On the other hand, the developer may not want to risk losing a potential market segment by disregarding a particular platform in his typical development cycle. Even for prominent platforms, such as iOS® and Android®, at any given time, there are multiple generations and iterations of these devices on the market, further complicating the development and testing process across multiple platforms. Even in a given platform, a variety of software, operating systems and browser applications are used by a potential target audience of a developer. This dynamic illustrates a need for a robust infrastructure that enables developers to test their products across multiple devices and platforms, without having to purchase or configure multiple devices and platforms.

SUMMARY

The appended claims may serve as a summary of this application.

BRIEF DESCRIPTION OF THE DRAWINGS

These drawings and the associated description herein are provided to illustrate specific embodiments of the invention and are not intended to be limiting.

DETAILED DESCRIPTION

Figure 1:
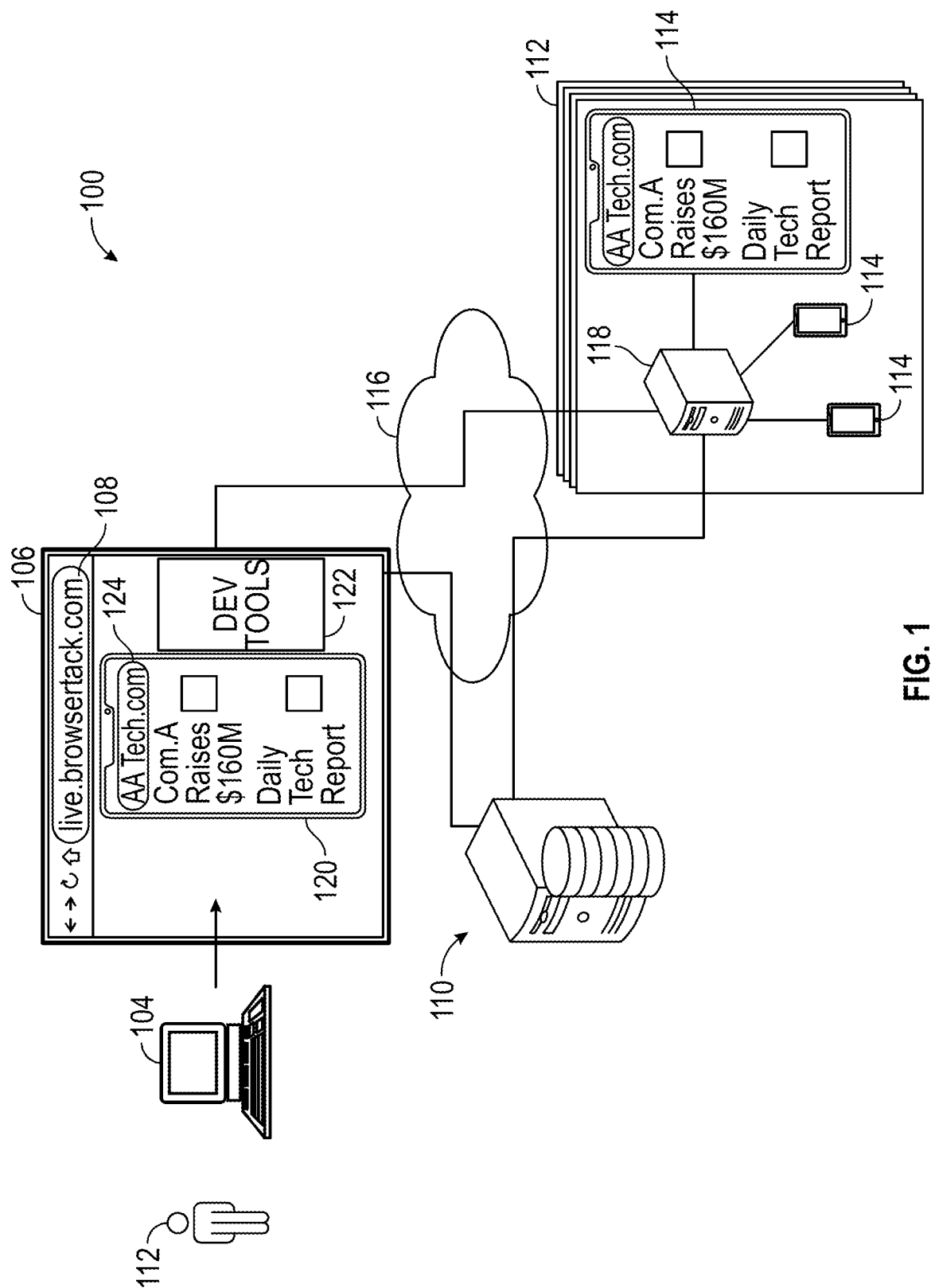
FIG. 1 illustrates an example remote test system.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

Software developers, particularly website, web application and mobile device application developers have a desire to manually test their products on a multitude of hardware and software platforms that their target audience may use. A variety of mobile device manufacturers provide the hardware consumers and businesses use. Examples include, devices manufactured by Apple Inc., Google LLC, Samsung Electronics Co. Ltd., Huawei Technologies Co. Ltd. and others. Similarly, a variety of operating systems for consumer electronic devices exist. Examples include Apple iOS®, Android® operating system (OS), and Windows® Mobile, Windows® Phone and others. Furthermore, users have a variety of choices as far as the web browser application they can use. Examples include Safari®, Chrome®, FireFox®, Windows Explorer®, and others. This variety of choice presents a difficult challenge for a web/app developer to test products on potential target devices. Traditionally, the developer might have to acquire a test device and spend resources configuring it (for example, by installing a target OS, browser, etc.) as well as a secondary hardware device to connect the test device through the secondary hardware device to a local machine of the developer, in order to write code and conduct tests on the test device. The sheer variety of possible devices, operating systems, browsers and combinations of them are numerous and can present a logistical hurdle to the developer.

A testing provider can enable a remote test system (RTS), having a multitude of devices for a developer to connect to and conduct tests. The developer can connect to the test system, select a test device, select a configuration (e.g., a particular browser, etc.) and run tests using the selected remote device. The RTS can include a server powering a website or a desktop application, which the developer can use to launch a dashboard for connecting to the RTS and for conducting tests. The dashboard can include a display of the remote device presented to the developer. The RTS system can capture developer inputs and input them to the remote device. The RTS mirrors the display of the remote device on the developer's local machine and simultaneously captures the developer's interactions inputted onto the mirrored display and transfers those commands to the remote device. In a typical case, the developer can use a keyboard and mouse to input interactions onto the mirrored display. When the test device is a smart phone device, the RTS system translates those input interactions compatible with the smart phone. Examples of smart phone input interactions include gestures, pinches, swipes, taps, and others. The remote device display is mirrored on the developer's local machine. In this manner, the developer can experience a seamless interaction with the remote device using the developer's local machine. The RTS can be used both for development of launched and unlaunched products.

FIG. 1 illustrates an example RTS 100. Although some embodiments use the RTS 100 in the context of testing and software development, the RTS 100 can be used to enable a remote session for any purpose. Testing is merely provided as an example context of usage area of the system and infrastructure of the RTS 100. A user 102 uses a local machine 104 to launch a browser 106 to access a dashboard application to interact with the RTS 100, connect to a remote device and to conduct tests on the remote device. In some embodiments, the dashboard website/web application may be replaced by a desktop application, which the user 102 can install on the local machine 104. The user 102 may be a software developer, such as a website developer, web application developer or a mobile application developer. The local machine 104, in a typical case, may be a laptop or desktop computer, which the user 102 can use to write software code, debug, or run tests on a website/web application or mobile application. The user 102 can enter a uniform resource locator (URL) 108 in browser 106 to connect to the dashboard application powered by a server 110. The server 110 can enable the browser 106 and a remote device 114 to establish a connection. The RTS 100 can use the connection for streaming the display of a remote device 114 onto the browser 106 in order to mirror the display of the remote device 114 and present it to the user 102. The RTS 100 can also capture user inputs entered into the mirrored display and input them to the remote device 114.

The RTS 100 can include multiple datacenters 112 in various geographical locations. The datacenters 112 can include a variety of test devices for the users 102 to connect with and to conduct tests. In this description, the test devices in datacenters 112 are referred to as remote devices 114, as they are remote, relative to the user 102 and the user's local machine 104. A variety of communication networks 116 can be used to enable connection between the browser 106, the server 110 and the remote device 114. The remote devices 114 can include various hardware platforms, provided by various manufacturers, different versions of each brand (for example, old, midmarket, new) and optionally various copies of each brand, to enable availability for numerous users 102 to connect and conduct tests.

The RTS 100 can use a host 118 connected to one or more remote devices 114. In some embodiments, the browser 106 does not directly communicate with the remote device 114. The host 118 enables communication between the browser 106 and the remote device 114 through one or more private and/or public communication networks. The host 118 can be a desktop, laptop, or other hardware connected with a wired or wireless connection to the remote device 114. The hardware used for the host 118 can depend on the type of the remote device 114 that it hosts. Examples of host 118 hardware can include Apple Macintosh® computers for iPhone® and iOS® devices and Zotac® for Android® devices.

The RTS 100 mirrors the display of the remote device 114 on the browser 106, by generating a display 120 on the browser 106. In some embodiments, the display 120 can be a graphical, or pictorial replica representation of the remote device 114. For example, if an iPhone® 12 device is chosen, the display 120 can be an image of an iPhone® 12. The RTS 100 mirrors the display of the remote device 114 on the display 120 by streaming a video feed of the display of the remote device 114 on the display 120. In some embodiments, the video stream used to mirror the display of the remote device 114 is generated by capturing and encoding screenshots of the display of the remote device 114 into a video stream feed of high frames per second to give the user 102 a seamless interaction experience with the display 120. Using input devices of the local machine 104, the user 102 can interact with the display 120, in the same manner as if the remote device 114 were locally present.

The RTS 100 captures and translates the user interactions to input commands compatible with the remote device 114 and inputs the translated input commands to the remote device 114. The display responses of the remote device 114 are then streamed to the user 102, via display 120. In some embodiments, the user 102 has access to and can activate other displays and menu options, such as developer tools display 122. An example usage of the RTS 100, from the perspective of the user 102, includes, the user 102, opening a browser on the remote device 114, via menu options provided by the dashboard application. The user 102 can access the dashboard application via the browser 106 on the user's local machine 104. The RTS 100 opens the user's selected browser on the remote device 114 and generates a display of the remote device 114 and the remotely opened browser on the browser 106 on the user's local machine 104. The user 102 can then use a mouse to click on a URL field 124 in the display 120, which corresponds to the URL field in the browser on the remote device 114. The user 102 can subsequently enter a URL address in the URL field 124. Simultaneously, the user's interactions, such as mouse clicks and keyboard inputs are captured and translated to the input commands compatible with the remote device 114 at the datacenter 112. For example, the mouse click in the URL field 124 is translated to a tap on the corresponding location on the display of the remote device 114 and the keyboard inputs are translated to keyboard inputs of the remote device 114, causing the remote device 114 to open the user requested URL and download the user requested website. Simultaneously, a video stream of the display of the remote device 114 is sent to and generated on the display 120 on browser 106. In this manner, the user perceives entering a URL in the URL field 124 and seeing the display 120 (a replica of the remote device 114) open the requested URL. Additional interactions of the user 102 can continue in the same manner. The user 102 can use the RTS 100 in the manner described above to perform manual or automated testing.

The display 120 is a pictorial and graphical representation of the remote device 114. The RTS 100 does not open a copy of the browser opened on the remote device 114 or conduct simultaneous parallel processes between the remote device 114 and the local machine 106. Instead, the RTS 100 streams a video feed from the remote device 114 to generate the display 120. Consequently, the user's interactions is inputted to the display 120, appearing as if a functioning browser is receiving the interactions, while the RTS 100 captures, transfers and translates those interactions to the remote device 114, where the functioning browser is operating on the remote device 114.

Figure 2:
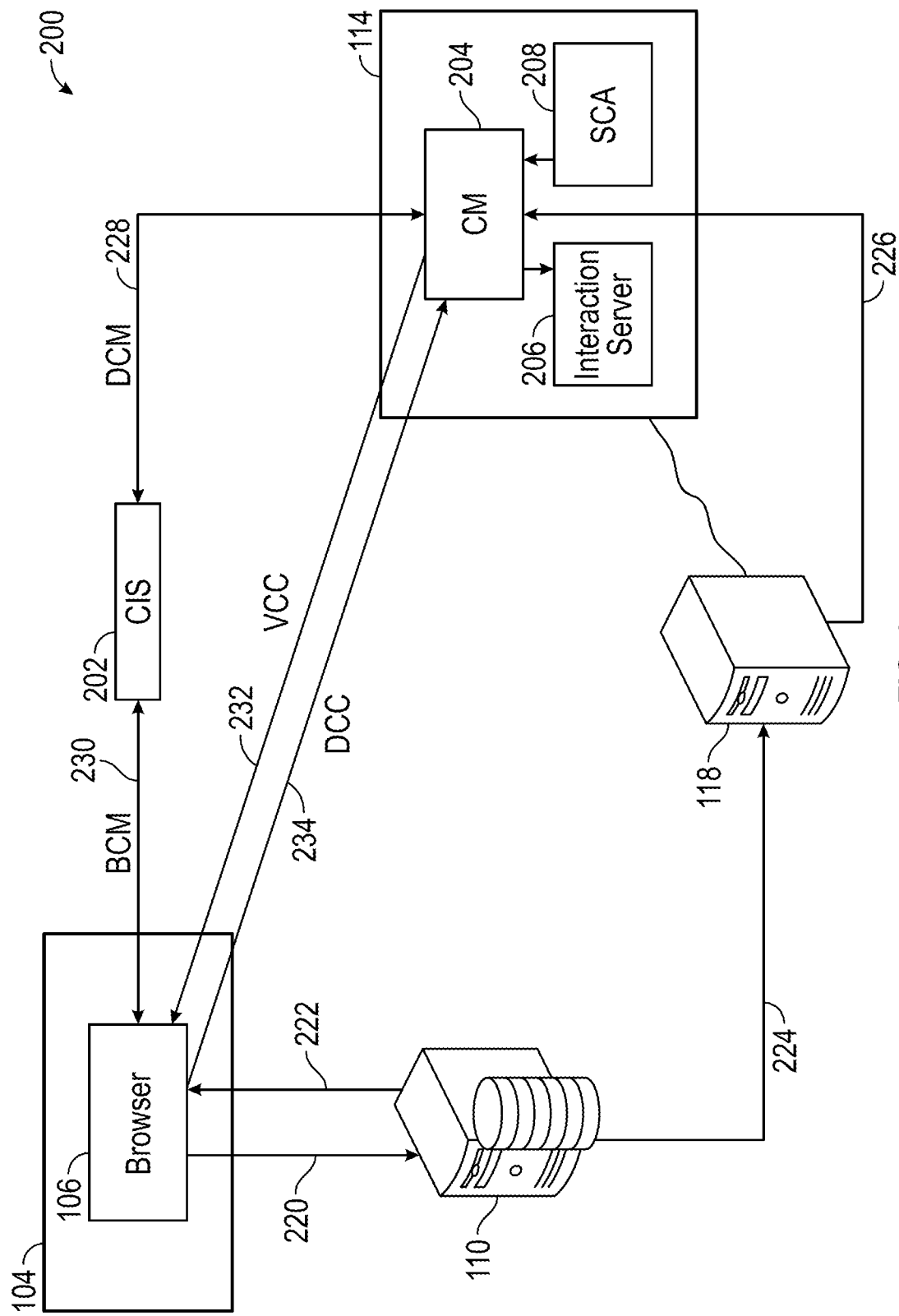
FIG. 2 illustrates a diagram of an example data flow implementation of the embodiment of FIG. 1.

FIG. 2 illustrates a diagram 200 of an example data flow implementation of the RTS 100. The example shown in FIG. 2 will be described in the context of the user 102 requesting to start a remote session. The remote session can be used for a variety of purposes. In one example, the remote session can be used to test a web application or a website. The user launches a dashboard application using the browser 106, running on the user's local machine 104. The dashboard application can provide menu options to the user 102 to choose initial test session parameters, including a type/brand of a test device, operating system, a browser brand, and an initial test URL to access. The browser 106, running the dashboard application, can generate and send a request 220 for starting a remote session to the server 110. The server 110 can be a central or a distributed server over several geographical locations, enabling access to the RTS 100 from various locations. The request 220 can include details, such as a type/brand of a test device, operating system, a browser brand, and an initial test URL to access. In response to the user's request 220, the RTS 100 can select a datacenter 112, a test device 114, and can dynamically generate a test session identifier (ID). In some embodiments, a communication network is used to enable communication between the browser 106 and the remote device 114. The RTS 100 can choose a communication initiation server (CIS) 202 and associate the test session ID with the CIS 202. The selected CIS 202 can be communicated to both the browser 106 and the remote device 114, using an identifier of the selected CIS 202 or a CIS ID. In some embodiments, the CIS 202 can help the browser 106 and the remote device 114 to establish a peer-to-peer (P2P) communication network to directly connect. Other communication networks can also be used.

The server 110 can provide initial handshake data to both the remote device 114 and the browser 106, in order to establish a communication network. For example, after choosing the CIS 202 and other initial parameters, the server 110 can issue a start session response 222 to the browser 106. The start session response 222 can include details, such as the test session ID and an identifier of the CIS 202 to be used for establishing communication. The server 110 can send a session parameter message (SPM) 224 to the host 118. The SPM 224 can include parameters of the test session, such as the CIS ID, selected device ID, test session ID, browser type, and the requested URL. The host 118 routes the SPM 224 via a message 226 to a communication module (CM) 204 of the remote device 114. The CM 204 can be a hardware, software or a combination component of the remote device 114, which can handle the communication with the browser 106. Depending on the type of communication network and protocol used, the structure and functioning of the CM 204 can be accordingly configured. For example, in some embodiments, the CM 204 can handle WebRTC messaging, encoding of the screenshots from the remote device 114, transmitting them to the browser 106 and handling the interactions received from the browser 106.

The browser 106, via the start session response 222 receives the CIS 202 ID and the test session ID. The CM 204, via the message 226, receives the same information. The CM 204 can send a device connection message (DCM) 228 to the CIS 202. The browser 106 can send a browser communication message (BCM) 230 to the CIS 202. Both DCM 228 and BCM 230 use the same test session ID. Therefore, the CIS 202 can authenticate both and connect them. Once connected, the browser 106 and the remote device 114 can exchange communication data and the routes via which they can communicate. For example, they can indicate one or more intermediary servers that may be used to carry on their communication.

In some embodiments, Web real-time communication (WebRTC) can be used to enable communication between the remote device 114 and the browser 106, for example, when the remote device 114 is a smartphone device. In this scenario, the CM 204 can include, in part, a libjingle module, which can implement the WebRTC protocol handshake mechanisms in the remote device 114. The handshake made available through the CIS 202 allows the remote device 114 and the browser 106 to exchange communication data routes and mechanisms, such as traversal using relays around NAT (TURN) servers, session traversal utilities for NAT (STUN) servers, interactive connectivity establishment (ICE) candidates, and other communication network needs. NAT stands for Network Address Translation.

Once the communication network between the browser 106 and the remote device 114 is established, a plurality of channels can be established between the two. Each channel can in turn include a plurality of connections. For example, the communication network between the browser 106 and the remote device 114 can include a video communication channel (VCC) 232. The VCC 232 can include a plurality of connections between the browser 106 and the remote device 114 and can be used to transmit a video stream of the display of the remote device 114 to the browser 106. The communication network between the browser 106 and the remote device 114 can also include a data communication channel (DCC) 234. The DCC 234 can include a plurality of connections between the browser 106 and the remote device 114 and be used to transmit the interactions the user 102 inputs into the mirrored display of the remote device generated on the browser 106. The mirrored display can alternatively be described as a replica display of the remote device 114.

To generate a mirrored display of the remote device 114 on the browser 106, the captured screenshots from a screen capturing application (SCA) 208 can be assembled into a video stream and transmitted to the browser 106. The process of assembling the screenshots from the SCA 208 to a video stream may include performing video encoding, using various encoding parameters. Encoding parameters may be dynamically modifiable or may be predetermined. As an example, the available bandwidth in VCC 232 can vary depending on network conditions. In some embodiments, a frames-per-second encoding parameter can be adjusted based in part on the available bandwidth in the VCC 232. For example, if a low bandwidth in VCC 232 is detected, the video stream constructed from the captured screenshots can be encoded with a downgraded frames-per-second parameter, reducing the size of the video stream, and allowing an interruption free (or reduced interruption) transmission of the live video stream from the remote device 114 to the browser 106.

Another example of dynamically modifying the encoding parameters include dynamically modifying, or modulating the encoding parameter, based on the availability of hardware resources of the remote device, or the capacity of the hardware resources of the remote device 114 that can be assigned to handle the encoding of the video stream. The CM 204 can use the hardware resources of the remote device 114 in order to encode and transmit the video stream to the browser 106. For example, CM 204 can use the central processing unit (CPU) of the remote device 114, a graphics processing unit (GPU) or both to encode the video stream. In some cases, these hardware resources can be in high usage, reducing their efficiency in encoding. The reduction in hardware resources availability or capacity can introduce interruptions in the encoding. In some embodiments, a frame rate sampling parameter of the encoding parameters can be modulated based on the availability or capacity of hardware resources, such as the CPU and/or the GPU of the remote device 114 that can be assigned to handle the encoding of the video stream. For example, if a high CPU usage is detected, when the CPU is to be tasked with encoding, the CM 204 can reduce the sampling rate parameter of the encoding, so the CPU is not overburdened and interruptions in the video feed are reduced or minimized.

The CM 204 can also configure the encoding parameters, based on selected parameters at the browser 106. The browser 106 receives the video stream via the VCC 232, decodes the video stream and displays in the video stream in a replica display of the remote device 114 on the browser 106. In some embodiments, a predetermined threshold frames-per-second parameter of the video stream at the browser 106 can be selected. The predetermined threshold frames-per-second parameter can be based on a preselected level of quality of the video stream displayed on the replica display. For example, in some embodiments, the predetermined threshold frames-per-second parameter at the browser can be set to a value above 25 frames-per-second to generate a seamless and smooth mirroring of the display of the remote device 114 on the browser 106. The CM 204 can configure the encoding parameters at the remote device 114 based on the predetermined threshold frames-per-second parameter set at the browser 106. For example, the CM 204 can encode the video stream with a frame rate above 30 fps, so the decoded video stream at the browser 106 has a frames-per-second parameter above 25 fps.

In some embodiments, the screen capturing application (SCA) 208 can be used to capture screenshots from the remote device 114. The SCA 208 can differ from device to device and its implementation and configuration can depend on the processing power of the device and the mandates of the operating system of the device regarding usage of the CPU/GPU in capturing and generating screenshots. For example, in Android® environment, the Android® screen capture application programming interface (APIs) can be used. In iOS® devices, iOS® screen capture APIs can be used. Depending on the processing power of the selected remote device 114, the SCA 208 can be configured to capture screenshots at a predefined frames per second (fps) rate. Additionally, the SCA 208 can be configured to capture more screenshots at the remote device 114 than the screenshots that are ultimately used at the browser 106. This is true in scenarios where some captured screenshots are dropped due to various conditions, such as network delays and other factors. For example, in some embodiments, the SCA 208 can capture more than 30 fps from the display of the remote device 114, while at least 20 fps or more are able to make it to the browser 106 and shown to the user 102. In the context of packaging and assembling the captured screenshots into a video stream transmitted to the browser 106, screenshots that are received out of order may need to be dropped to maintain a fluid experience of the remote device 114 to the user 102. For example, the captured screenshots are streamed over a communication network to the browser 106, using various protocols, including internet protocol suite (TCP/IP), user datagram protocol, and/or others. When unreliable transmission protocols are used, it is possible that some screenshots arrive at browser 106 out of order. Out of order screenshots can be dropped to maintain chronology at the video stream displayed on browser 106. Some captured screenshots might simply drop as a result of other processing involved. For example, some screenshots may be dropped, due to lack of encoding capacity, if heavy animation on the remote device 114 is streamed to the browser 106. Consequently, in some embodiments, more screenshots are captured at the remote device 114 than are ultimately shown to the user 102.

The upper threshold for the number of screenshots captured at the remote device 114 can depend, in part, on the processing power of the remote device 114. For example, newer remote devices 114 can capture more screenshots than older or midmarket devices. The upper threshold for the number of screenshots can also depend on an expected bandwidth of a communication network between the remote device 114 and the browser 106.

The SCA 208 can be a part of or make use of various hardware components of the remote device 114, depending on the type of the selected remote device 114, its hardware capabilities and its operating system requirements. For example, some Android® devices allow usage of the device's graphical processing unit (GPU), while some iOS® devices limit the usage of GPU. For remote devices 114, where the operating system limits the use of GPU, the SCA 208 can utilize the central processing unit (CPU) of the remote device 114, alone or in combination with the GPU to capture and process the screenshots. The SCA 208 can be implemented via the screen capture APIs of the remote device 114 or can be independently implemented. Compared to command line screen capture tools, such as screencap command in Android®, the SCA 208 can be configured to capture screenshots in a manner that increases efficiency and reliability of the RTS 100. For example, command line screenshot tools, may capture high resolution screenshots, which can be unnecessary for the application of the RTS 100, and can slow down the encoding and transmission of the video stream constructed from the screenshots. Consequently, the RTS 100 can be implemented via modified native screenshot applications, APIs or independently developed and configured to capture screenshots of a resolution suitable for efficient encoding and transmission. As an example, using command line screen capture tools, a frames-per-second rate of only 4-5 can be achieved, which is unsuitable for mirroring the display of the remote device 114 on the browser 106 in a seamless manner. On the other hand, the described embodiments achieve frames-per-second rates of above 20 frames per second. In some embodiments, the CM 204 can down-sample the video stream obtained from the captured screenshots, from for example, a 4K resolution to a 1080P resolution. Still, in older devices, the down-sampling may be unnecessary, as the original resolution may be low enough for efficient encoding and transmission.

In some embodiments, the remote device 114 and the browser 106 can connect via a P2P network, powered by WebRTC. The CM 204 can then include a modified libjingle module. In the context of the RTS 100, the relationship between the browser 106 and the remote device 114 is more of a client-server type relationship than a pure P2P relationship. An example of a pure P2P relationship is video teleconferencing, where both parties transmit video to one another in equal and substantial size. In the context of the RTS 100, the transfer of video is from CM 204 to the browser 106, and no video is transmitted from the browser 106 to the CM 204. Therefore, compared to a P2P libjingle, the CM 204 and its libjingle module, as well as communication network parameters between the browser 106 and the remote device 114, can be modified to optimize for the transfer of video from the remote device 114 to the browser 106. An example modification of libjingle includes modifying the frames-per-second rate in favor of video transfer from the remote device 114. Other aspects of encoding performed by libjingle module of the CM 204 can include adding encryptions and/or other security measures to the video stream. When WebRTC is used to implement the communication network between the remote device 114 and the browser 106, libjingle module of the CM 204 can encode the video stream in WebRTC format.

While FIG. 2 illustrates messaging lines directly to the CM 204, this is not necessarily the case in all embodiments. In some implementations, the DCM 28, BCM 230, VCC 232, and DCC 234 can be routed through the host 118. The communication network between the remote device 114 and the browser 106, having channels, VCC 232 and DCC 234 can be implemented over the internet via a WiFi connection at the datacenter 112 where the remote device 114 is located, or can be via an internet over universal serial bus (USB) via the host 118, or a combination of wired or wireless communication to the internet. In some cases, one or more methods of connecting to the internet is used as a backup to a primary mode of connection to the internet and establishing the communication network between the remote device 114 and the browser 106.

The CM 204 can receive, via the DCC 234, user interactions inputted to the replica display on the browser 106. The CM 204 can route the received user interactions to an interaction server 206 for translation to a format compatible with the remote device 114. In a typical case, the user 102 runs the browser 106 on a laptop or desktop machine and inputs commands and interacts with the replica display on the browser 106, using the input devices of the local machine 104. Input devices of the local machine 104 generate mouse or keyboard user interactions, which are captured and transferred to the CM 204. In some embodiments, JavaScripts® can be used to capture user interactions inputted in the replica display on the browser 106. The captured user interactions are then encoded in a format, compatible with the format of the communication network established between the browser 106 and the remote device 114. For example, if WebRTC is used, the user interactions are formatted in the WebRTC format and sent over the DCC 234 to the CM 204.

The CM 204 decodes and transfers the user interactions to the interaction server 206. The interactions server 208 translates the mouse and keyboard user interactions to inputs compatible with the remote device 114. For example, when the remote device 114 is a mobile device, such as a smartphone or tablet having a touch screen as an input device, the interaction server 206 can translate keyboard and mouse inputs to gestures, swipes, pinches, and other commands compatible with the remote device 114. The translation of user interactions to remote device inputs also takes advantage of the coordinates of the inputs. For example, a meta data file accompanying the user interactions can note the coordinates of the user interactions on the replica display on the browser 106. The meta data can also include additional display and input device information of the user local machine 104 and the replica display on the browser 106.

The interaction server 206 also maintains or has access to the resolution and setup of the display of the remote device 114 and can make a conversion of a coordinate of an input on the replica display versus a corresponding coordinate on the real display of the remote device 114. For example, in some embodiments, the interaction server 206 can generate coordinate multipliers to map a coordinate in the replica display on the browser 106 to a corresponding coordinate in the real display of the remote device 114. The coordinate multipliers can be generated based on the resolutions of the replica display and the real display. The interaction server 206 then inputs the translated user interactions to the remote device 114. The display output of the remote device 114 responding to the input of the translated user inputs are captured via the SCA 208, sent to the CM 204, encoded in a format compatible with the communication network between the remote device 114 and the browser 106 (e.g., WebRTC) and sent to the browser 106. The browser 106 decodes the received video stream, displaying the video stream in the replica display on the browser 106. The data flow over the DCC 234 and the VCC 232 happen simultaneously or near simultaneously, as far as the perception of the user 102, allowing for a seamless interaction of the user 102 with the replica display, as if the remote device 114 were present at the location of the user 102.

Figure 3:
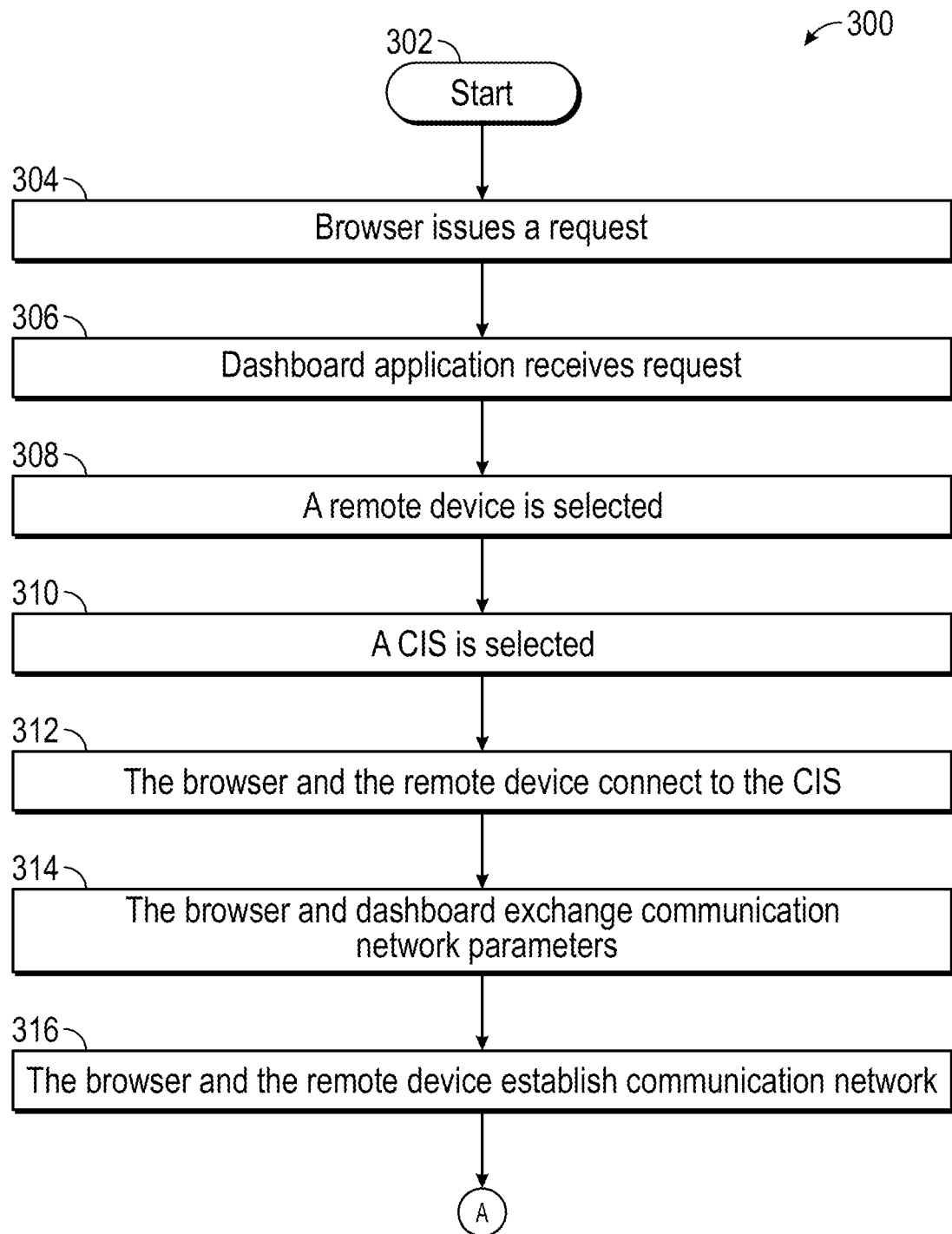
FIG. 3 illustrates a flow chart of a method of enabling a remote session at a first location using a remote device at a second location.
Figure 3:
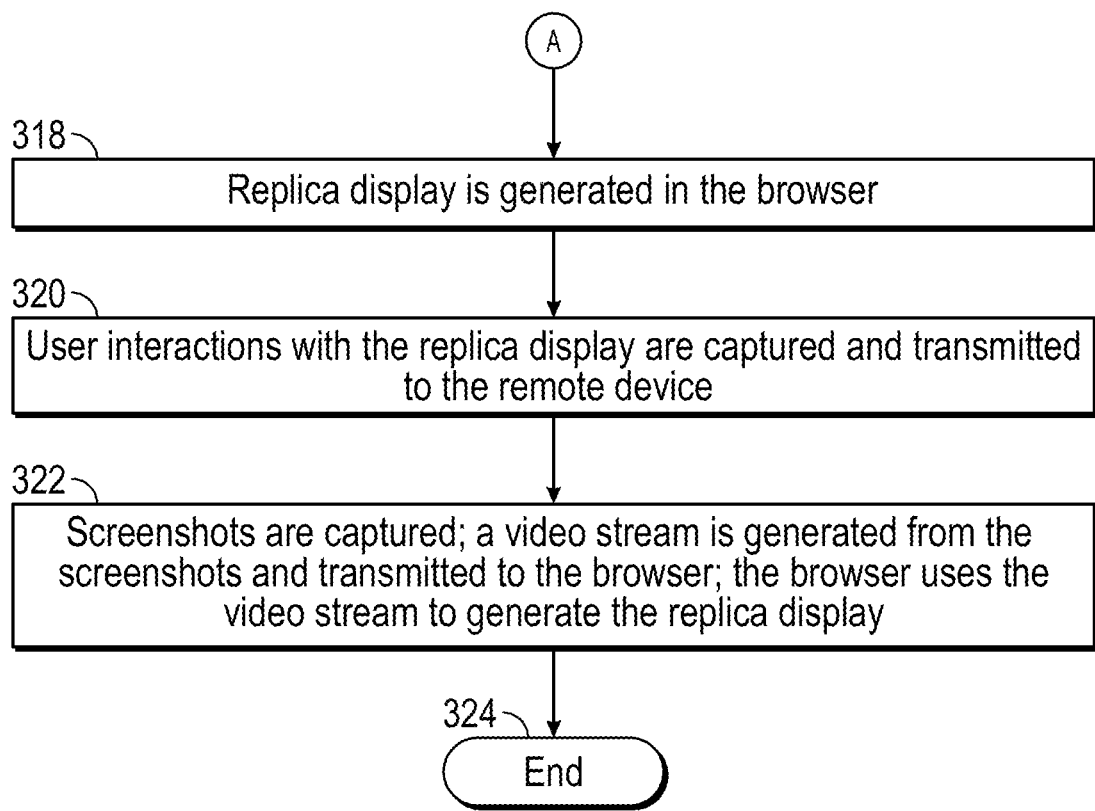

FIG. 3 illustrates a flow chart of a method 300 of enabling a remote session at a first location using a remote device at a second location. The method 300 utilizes the RTS 100 as described above. The method 300 starts at step 302. At step 304, the browser 106 at a first location issues a request 220 to start a remote session at the first location, using a remote device at the second location. The request 220 can include a type/brand of a remote device, a browser to be opened on the remote device and a test URL to be accessed on the remote device. At step 306, the request 220 is received at a dashboard application of the RTS 100. The dashboard application may be locally installed, as a desktop application or may be a web application, accessible via a URL entered in the browser 106. The dashboard application can be powered by a server 110. At step 308, the server 110 can select a remote device 114 from a plurality of remote devices at the second location. The selection of the remote device is based on the user choice in the request 220. The selected remote device 114 can launch the browser type/brand, as indicated in the request 220. The selected remote device 114 can access the test URL, as indicated in the request 220.

At step 310, the server 110 selects a communication initiation server (CIS) 202 to allow the browser 106 and the selected remote device 114 to establish a connection. At step 312, both the browser 106 and the remote device 114 connect to the CIS 202, using the same test session ID. At step 314, the browser 106 and the remote device 114, via the CIS 202, exchange parameters of a communication network between the two. At step 316, the browser 106 and the remote device 114 establish the communication network, using the exchanged parameters. The exchanged parameters can include the routes, ports, gateways, and other data via which the browser 106 and the remote device 114 can connect. The communication network between the two includes a video channel, VCC 232 and a data channel, DCC 234.

At step 318, a replica display of the selected remote device 114 is generated in the browser 106. The browser 106 can receive, via the video channel, a video stream of the display output of the remote device 114 and use that to generate the replica display. At step 320, user interactions with the replica display are captured and transmitted, via the data channel DCC 234 to the remote device 114. At step 322, the SCA 208 captures screenshots of the display screen of the remote device 114. The CM 204 uses the captured screenshots to generate a video stream of the screen of the remote device 114. The CM 204 transmits, via the video channel VCC 232, the video stream to the browser 106, which uses the video stream to generate the replica display. The method 300 ends at step 324.

Figure 4:
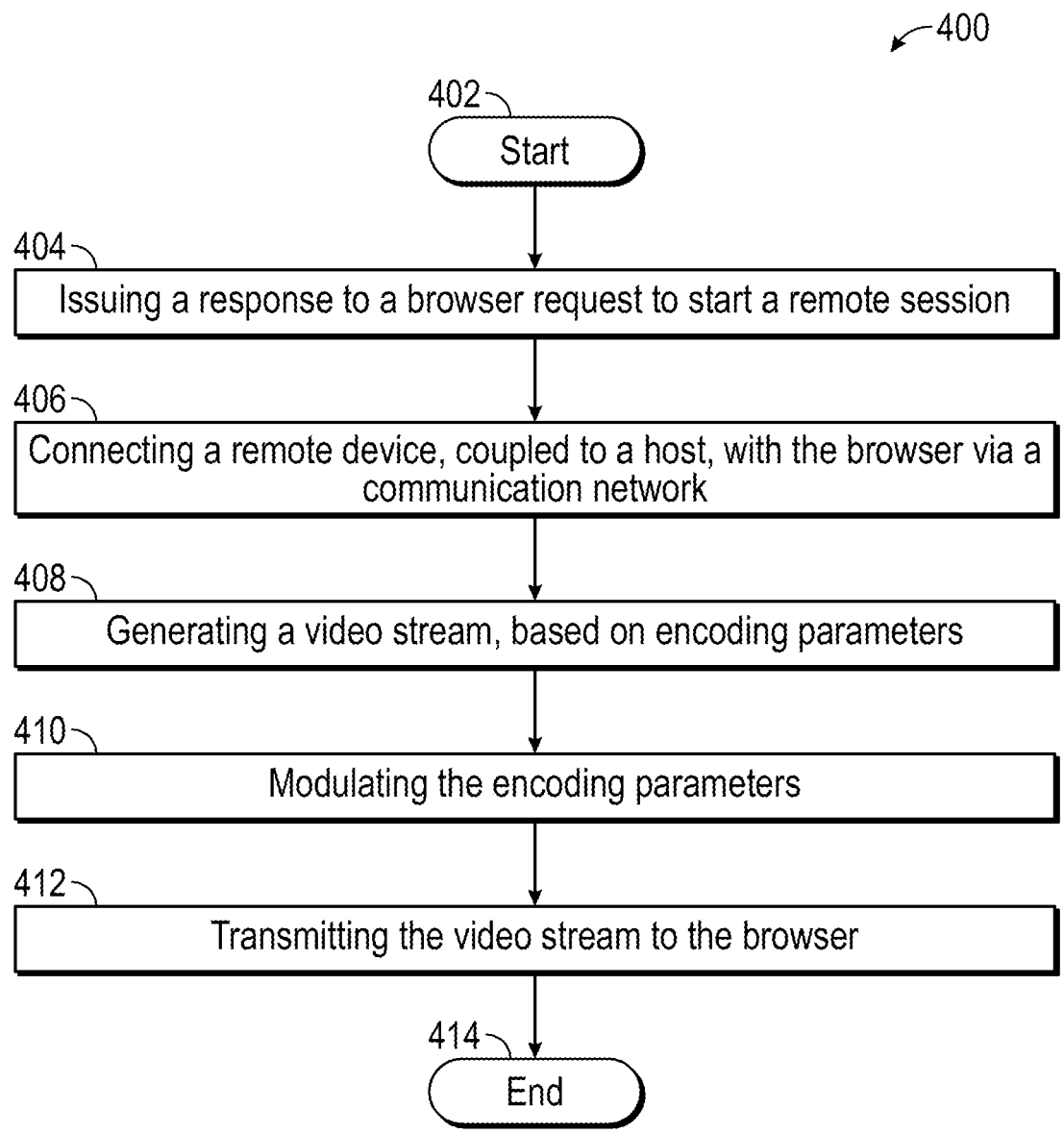
FIG. 4 illustrates a flowchart of a method of an example operation of a remote test system.

FIG. 4 illustrates a flowchart of a method 400 of an example operation of the RTS 100. The method 400 starts at step 402. At step 404, a request to start a remote session using a remote device is received at a dashboard application, powered by a server 110. The server 110 selects a CIS 202, a remote device 114 and issues a response to the browser 106. The response includes an identifier of the CIS 202 and an identifier of the test session. At step 406, the browser 106 and the remote device 114 establish a communication network and connect to one another using the communication network. The remote device 114 connects to the communication network via a host 118.

At step 408, the CM 204 generates a video stream from the screenshots captured by the SCA 208, based on one or more encoding parameters. An example of the encoding parameters includes a frames-per-second parameter of the encoding. At step 410, the CM 204 modules the encoding parameters based on one or more factors, including bandwidth of the VCC 232, and available capacity of hardware resources of the remote device 114 for encoding operations, including capacity of CPU and/or GPU of the remote device 114. The CM 204 can also modulate the encoding parameters based on a predetermined minimum threshold of frames per second video stream decoded and displayed at the browser 106. At step 412, the CM 204 transmits the video stream to the browser 106 to display. The method 400 ends at step 414.

Figure 5:
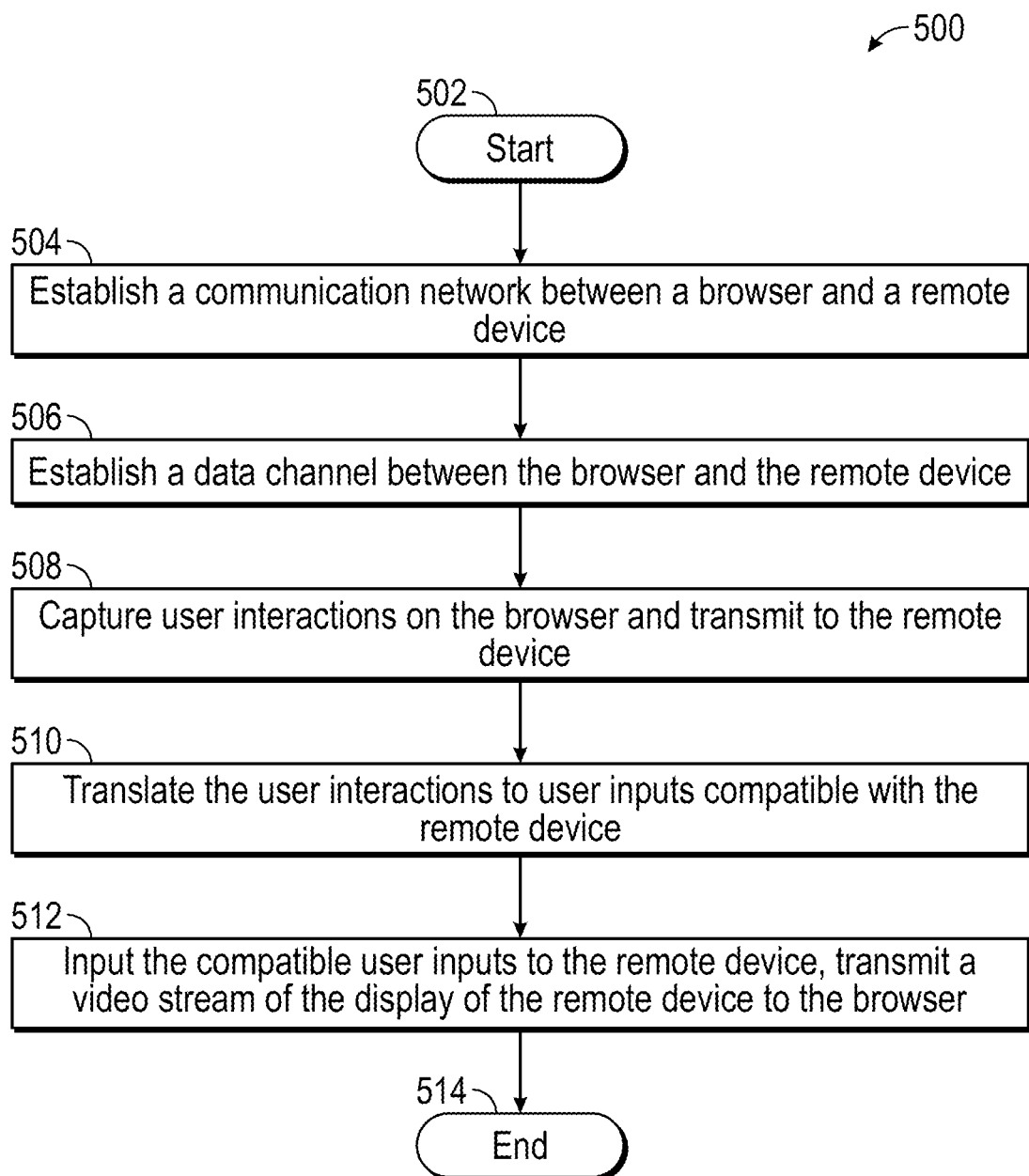
FIG. 5 illustrates another flowchart of a method of an example operation of the remote system.

FIG. 5 illustrates a flowchart of a method 500 of an example operation of the RTS 100. The method starts at step 502. At step 504, a communication network is established between the browser 106 and the remote device 114. In some embodiments, the communication network can be a P2P, WebRTC. The CM 204 in the remote device 114 can handle the translation, encoding and data packaging for transmission over the communication network. At step 506, a data channel DCC 234 is established using the communication network. The data channel can be used to transmit user interactions entered into a replica display in browser 106 to the remote device 114. At step 508, the user interactions with the replica display on browser 106 are captured and transmitted to the CM 204. In some embodiments, the DCC 234 is through the host 118 and in other embodiments, a WiFi network at datacenter 112 where the remote device 114 is located can be used to connect the CM 204 and the browser 106. The CM 204 transfers the user interactions to the interaction server 206.

At step 510, the interaction server 206 translates the user interactions to user inputs compatible with the remote device 114. For example, if the remote device 114 is a mobile computing device, such as a smartphone or smart tablet, the interaction server 206 translates keyboard and mouse inputs to touch screen type inputs, such as taps, swipes, pinches, double tap, etc. The interaction server 206 may use coordinate multipliers to translate the location of a user interaction to a location on the display of the remote device 114. The coordinate multipliers are derived from the ratio of the resolution and/or size difference between the replica display on the browser 106 and the display screen of the remote device 114. At step 512, the user inputs are inputted into the remote device 114 at the corresponding coordinates. The remote devices's display output response to the user inputs are captured via SCA 208, turned into a video stream and transmitted to the browser 106. The browser 106 displays the video stream in the replica display. The method 500 ends at the step 514.

Example Implementation Mechanism Hardware Overview

Some embodiments are implemented by a computer system or a network of computer systems. A computer system may include a processor, a memory, and a non-transitory computer-readable medium. The memory and non-transitory medium may store instructions for performing methods, steps and techniques described herein.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computers, cloud computing computers, desktop computer systems, portable computer systems, handheld devices, networking devices or any other device that incorporates hard-wired and/or program logic to implement the techniques.

Figure 6:
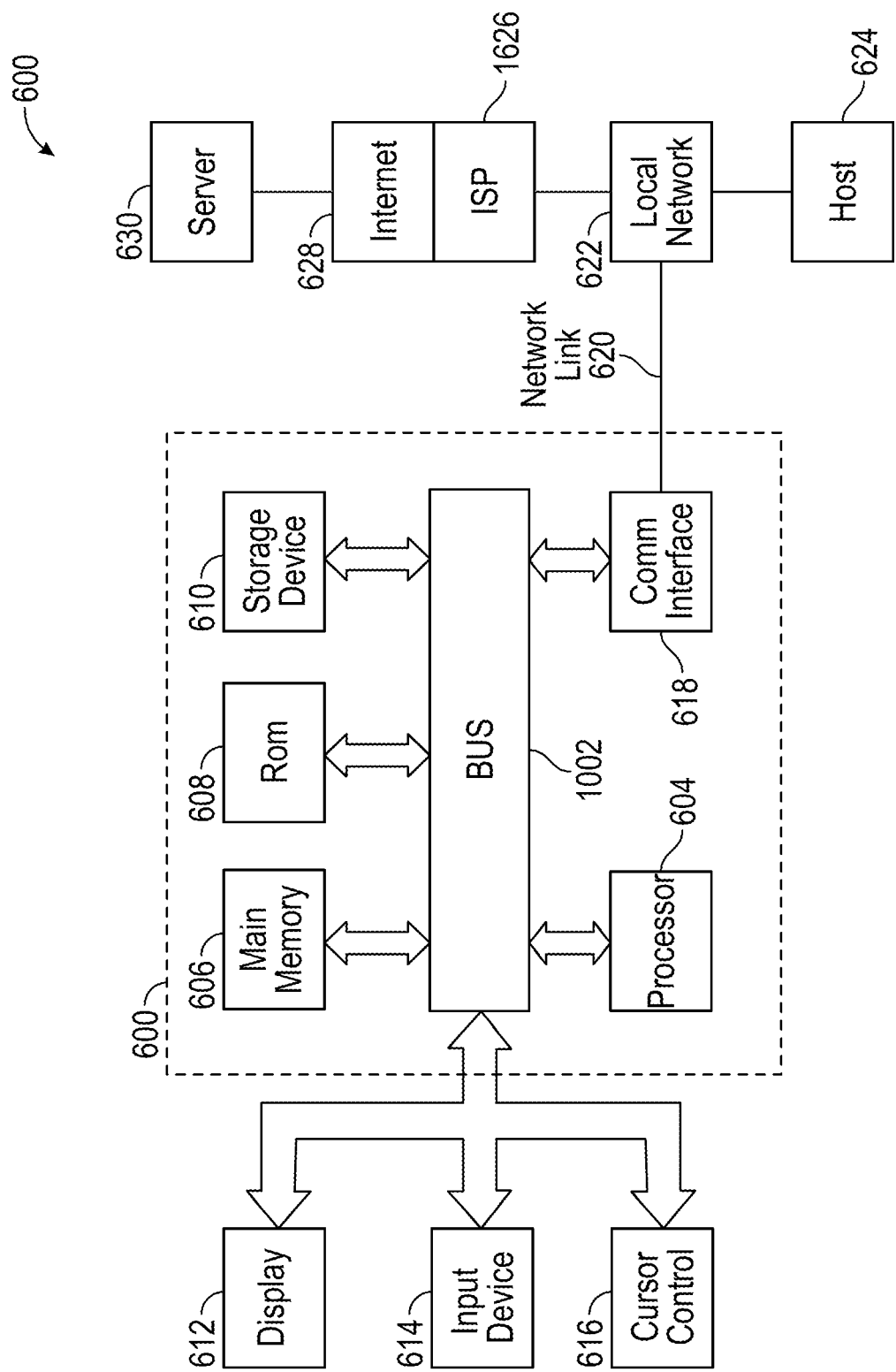
FIG. 6 illustrates an example environment within which some described embodiments can be implemented.

For example, FIG. 6 is a block diagram that illustrates a computer system 600 upon which an embodiment of can be implemented. Computer system 600 includes a bus 602 or other communication mechanism for communicating information, and a hardware processor 604 coupled with bus 602 for processing information. Hardware processor 604 may be, for example, special-purpose microprocessor optimized for handling audio and video streams generated, transmitted or received in video conferencing architectures.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid state disk is provided and coupled to bus 602 for storing information and instructions.

Computer system 600 may be coupled via bus 602 to a display 612, such as a cathode ray tube (CRT), liquid crystal display (LCD), organic light-emitting diode (OLED), or a touchscreen for displaying information to a computer user. An input device 614, including alphanumeric and other keys (e.g., in a touch screen display) is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the user input device 614 and/or the cursor control 616 can be implemented in the display 612 for example, via a touch-screen interface that serves as both output display and input device.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical, magnetic, and/or solid-state disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution.

Some remote devices 114 do not provide a high-performance screenshot capturing API, suitable for efficient operations of the RTS 100. On the other hand, some operating systems of the remote devices 114 can support a video capturing API for the purposes of recording and/or broadcasting the display of the remote device 114 in real time. In these scenarios, the SCA 208 can be implemented using a video capturing API of the operating system of the remote device 114. As an example, for some iOS® devices, when the SCA 208 is implemented, using a native screenshot application, the FPS achieved on browser 106 can drop to as low as 5 FPS in some cases. At the same time, iOS® in some versions, provides a video capturing facility, such as ReplayKit, which can be used to implement the operations of the SCA 208. When a video capturing API is used, corresponding modifications to the data flow and operations of the RTS 100 are also implemented as will be described below.

Figure 7:
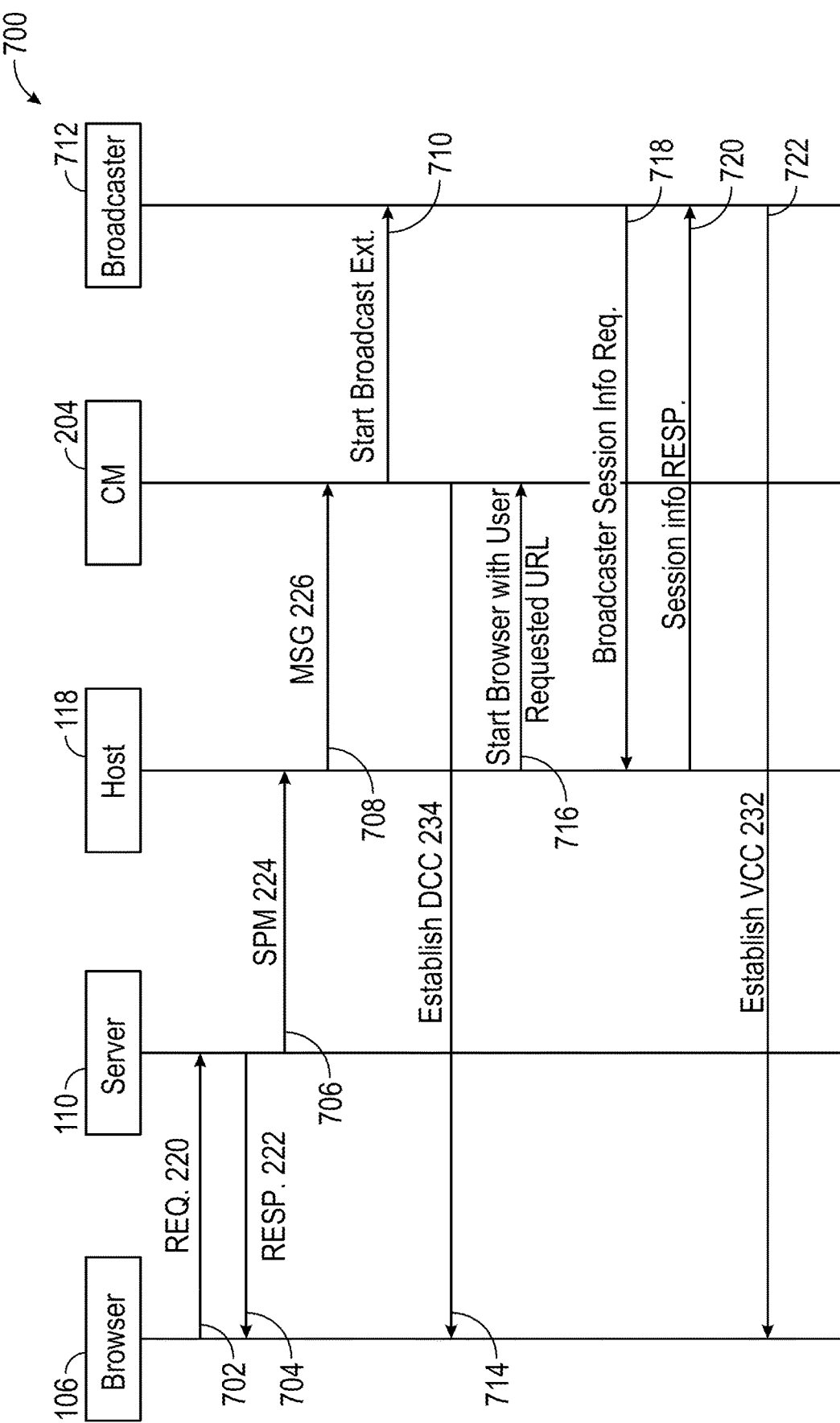
FIG. 7 illustrates an example data flow diagram of the operations of an infrastructure enabling a remote session using a remote device, using a video capturing API.

FIG. 7 illustrates an example data flow diagram 700 of the operations of the RTS 100, using a video capturing API for implementing the SCA 208. The diagram 700 is provided as an example. Persons of ordinary skill in the art can modify the diagram 700, without departing from the spirit of the disclosed technology. Some platforms and operating systems may provide an API for capturing a video stream of the remote device 114. For example, iOS® provides such an API in ReplayKit. The captured video stream can be used to replicate the display of the remote device 114 in lieu of using static screenshots to generate the video stream. In some cases, the SCA 208 can be implemented using the video capturing API provided by the remote device 114. For example, a launcher application can include a broadcaster extension, which can output a video stream of the display of the remote device 114. In other embodiments, a broadcast extension, broadcasting the video stream, can be an extension to a launcher application, which the host 118 uses to control the operations of the remote device 114. Various implementations are possible. Some are described below.

At step 702, the browser 106 can send a request 220 to start a remote session to the server 110. At step 704, the server 110 can respond by sending a response 222 to the browser 106. At step 706, the server 110 can send a SPM 224 to the host 118. At step 708, the host 118 can send a message 226 to the CM 204. The steps 702-708 enable the remote device 114 and the browser 106 to log in to a communication initiation server (CIS) 202 with the same credentials, such as a common remote session identifier, thereafter, exchange communication network parameters, and establish communication using the communication network.

At step 710, the CM 204 can signal a broadcaster 712 to launch and begin capturing a video stream of the display of the remote device 114. As described earlier, the broadcaster 712 can be a stand-alone application or can be an extension to a launcher application that the host 118 runs on the remote device 114 to perform the operations of the RTS 100. For example, when ReplayKit is used, the ReplayKit API provides a broadcaster extension which can run as an extension of an application and provide a video stream of the display of the remote device 114 to that application.

At this stage, the DCM 228 and the BCM 230 have already occurred between the browser 106 and the CM 204, allowing the browser 106 and the CM 204 to exchange network communication parameters via the CIS 202. The network communication parameters can include network pathways, servers, and routes via which the two can establish one or more future communication networks. The browser 106 and the CM 204 establish a communication network and connect using these network communication parameters. At step 714, the CM 204 can establish a DCC 234 with the browser 106. The DCC 234 can be used in the future operations of the RTS 100 to capture user interactions on the replica display generated on the browser 106 and transmit them to the remote device 114. At step 716, the host can extract a requested URL and a type of browser from the user's initial request (at step 720) and launch the chosen browser on the remote device 114, with a request for the remote device browser to access the user requested URL.

At step 718, the broadcaster 712 can query the host 118 for session and user data to determine where and how to establish a video channel to broadcast the video stream feed of the display of the remote device 114. At step 720, the host 118 responds to the broadcaster 712 with session and user data. The session and user data can include an identifier of the session, a user identifier, network details, gates and ports, pathways or other information related to the remote session and/or the communication network established between the CM 204 and the browser 106. At step 722, the broadcaster 712 can use the session and/or user data, received at step 720, to establish the VCC 232 and begin broadcasting the video stream of the display of the remote device 114 to the browser 106. A dashboard application, executable on and/or by the browser 106, can generate a replica display of the remote device 114 on the browser 106 and use the video stream received on the VCC 232 to populate the replica display with a live video feed of the display of the remote device 114. In some implementations, the CM 204 can set up or modify the encoding parameters of the video from the broadcaster 712. For example, the CM 204 can be configured to determine the bandwidth of the VCC 232 and modify the FPS encoding parameter of the video stream to increase the likelihood of an efficient, stable and/or performant video stream on the browser-end. The dashboard application executable on the browser 106 can decode the video received on the VCC 232 and use the decoded video to generate the replica display on the browser 106. Other examples of the CM 204 modifying the encoding parameters of the video sent on the VCC 232 are described above in relation to the pervious embodiments. The CM 204 can apply the same techniques to the embodiments, where a broadcaster 712 is used. As described earlier, having the VCC 232 consume a video stream, via the broadcaster 712, can offer advantages, such as more efficient encoding, and having a higher and more stable FPS performance.

Examples

It will be appreciated that the present disclosure may include any one and up to all of the following examples.

Example 1: a method of enabling a remote session at a first location, using a remote device 114 at a second location 112, the method comprising: issuing, from a browser 106 at the first location, a request 220 to start a remote session at the first location, using a remote device 114 at the second location 112; receiving the request at a dashboard application; selecting a remote device 114 from a plurality of remote devices 114 at the second location; selecting a communication initiation server 202; connecting, via the communication initiation server 202, the browser 106 and the remote device 114; exchanging, via the communication initiation server 202, parameters of a communication network between the browser 106 and the selected remote device 114; establishing the communication network between the browser 106 and the selected remote device 114, wherein establishing the communication network further comprises establishing a video channel 232 and a data channel 234; generating a replica display of the selected remote device in the browser 106; capturing user interactions with the replica display; transmitting the user interactions, via the data channel 234, to the selected remote device 114; capturing screenshots from a display screen of the selected remote device 114; generating a video stream from the captured screenshots; and transmitting the video stream, via the video channel 232, to the replica display in the browser 106.

Example 2: the method of Example 1, further comprising: in response to the request 220 to start the remote session, issuing a response 222 to the browser, the response 222 comprising an identifier of the selected communication initiation server 202 and an identifier of the remote session, and wherein connecting, via the communication initiation server 202, further comprises: the browser 106 and the selected remote device 114 connecting to the selected communication initiation server 202, using the identifier of the remote session.

Example 3: the method of some or all of examples 1 and 2, further comprising: sending a response 222 to the browser, the response 222 comprising an identifier of the selected communication initiation server 202 and an identifier of the remote session; sending a session parameter message 224 to a host 118, at the second location 112, wherein the host 118 is electrically connected to the selected remote device 114; and transmitting, via the host 118, a message 226 to the selected remote device 114, wherein the session parameter message 224 and the message 226 both comprise the identifier of the selected communication initiation server 202 and the identifier of the remote session.

Example 4: the method of some or all of the Examples 1-3, wherein generating the video stream further comprises: encoding the video stream based on one or more encoding parameters, and, wherein the method further comprises: decoding, by the browser 106, the received video stream and displaying the decoded video stream in the replica display in the browser 106.

Example 5: the method of some or all of the Examples 1-4, wherein the encoding parameters further comprise a frames-per-second parameter of the video stream and the method further comprises: determining a bandwidth of the video channel 232 and downgrading the frames-per-second parameter of the video stream when the bandwidth is below a predetermined threshold.

Example 6: the method of some or all of the Examples 1-5, further comprising: modulating a frame rate sampling parameter of the encoding based at least in part on capacity of a CPU and/or GPU of the remote device 114 available for encoding.

Example 7: the method of some or all of the Examples 1-6, further comprising: modifying the one or more encoding parameters, at the remote device 114, such that the decoded video stream at the replica display at the browser 106 comprise a video stream having a frames-per-second parameter above a predetermined threshold.

Example 8: the method of some or all of the Examples 1-7, wherein the communication network between the browser 106 and the remote device 114 is a WebRTC network, and the encoding is performed by a modified libjingle configured to receive the screenshots from a screenshot capturing application.

Example 9: the method of some or all of the Examples 1-8, wherein capturing the screenshots is performed by screen capture APIs of the remote device 114.

Example 10: the method of some or all of the Examples 1-9, further comprising: translating the user interactions to remote device inputs; and inputting the remote device inputs to the remote device 114.

Example 11: the method of some or all of the Examples 1-10, wherein translating further comprises: determining coordinates of the user interactions in the replica display on the browser 106; and mapping the coordinates of the user interactions in the replica display in the browser 106 to coordinates on the display screen of the remote device 114.

Example 12: a non-transitory computer storage that stores executable program instructions that, when executed by one or more computing devices, configure the one or more computing devices to perform operations comprising: issuing, from a browser 106 at a first location, a request to start a local test remote session at the first location, using a remote device 114 at a second location 112; receiving the request 220 at a dashboard application; selecting a remote device 114 from a plurality of remote devices 114 at the second location 112; selecting a communication initiation server 202; connecting, via the communication initiation server 202, the browser 106 and the remote device 114; exchanging, via the communication initiation server 202, parameters of a communication network between the browser 106 and the selected remote device 114; establishing the communication network between the browser 106 and the selected remote device 114, wherein establishing the communication network further comprises establishing a video channel 232 and a data channel 234; generating a replica display of the selected remote device 114 in the browser 106; capturing user interactions with the replica display; transmitting the user interactions, via the data channel 234, to the selected remote device 114; capturing screenshots from a display screen of the selected remote device 114; generating a video stream from the captured screenshots; and transmitting the video stream, via the video channel 232, to the replica display in the browser 106.

Example 13: the non-transitory computer storage of Example 12, wherein generating the video stream further comprises: encoding the video stream based on one or more encoding parameters, and, wherein the operations further comprise: decoding, by the browser, the received video stream and displaying the decoded video stream in the replica display in the browser.

Example 14: the non-transitory computer storage some or all of the Examples 12 and 13, wherein the encoding parameters further comprise a frames-per-second parameter of the video stream and the operations further comprise: determining a bandwidth of the video channel and downgrading the frames-per-second parameter of the video stream when the bandwidth is below a predetermined threshold.

Example 15: the non-transitory computer storage of some or all of the Examples 12-14, wherein the operations further comprise: modulating a frame rate sampling parameter of the encoding based at least in part on capacity of a CPU and/or GPU of the remote device available for encoding.

Example 16: a method comprising: issuing, from a browser at a first location, a request to start a remote session at the first location, using a remote device at a second location; receiving the request to start a session at a server; selecting, by the server, a remote device, from a plurality of remote devices at the second location; selecting, by the server, a communication initiation server; transmitting an identifier of the communication initiation server to a host, at the second location, the host coupled to the selected remote device at the second location; the host transmitting the identifier of the communication initiation server to the selected remote device; connecting, via the communication initiation server, the browser and the selected remote device; exchanging, via the communication initiation server, parameters of a communication network between the browser and the selected remote device; launching an application on the selected device, the launched application broadcasting a video stream of the display of the selected remote device; establishing the communication network between the browser and the selected remote device, wherein establishing the communication network further comprises establishing a video channel between the browser and the remote device via the host; generating a replica display of the selected remote device on the browser; transmitting the broadcast video stream, from the selected remote device to the host and from the host to the browser, via the video channel; and displaying the broadcast video stream in the replica display in the browser.

Example 17: the method of Example 16 further comprising: establishing a data channel via the communication network; capturing user interactions with the replica display; and transmitting the user interactions, via the data channel to the selected remote device.

Example 18: the method of some or all of Examples 16 and 17 further comprising: in response to the request to start the remote session, issuing a response to the browser, the response comprising an identifier of the selected communication initiation server and an identifier of the remote session, and wherein connecting, via the communication initiation server, further comprises: the browser and the selected remote device connecting to the selected communication initiation server, using the identifier of the remote session.

Example 19: the method of some or all of Examples 16-18, further comprising: sending a response to the browser, the response comprising an identifier of the selected communication initiation server and an identifier of the remote session; sending a session parameter message to the host, at the second location, wherein the host is electrically connected to the selected remote device; and transmitting, via the host, a message to the selected remote device, wherein the session parameter message 224 and the message 226 both comprise the identifier of the selected communication initiation server 202 and the identifier of the remote session.

Example 20: the method of some or all of Examples 16-19, further comprising: encoding the broadcast video stream based on one or more encoding parameters; decoding, by the browser, the received video stream and displaying the decoded video stream in the replica display in the browser.

Example 21: the method of some or all of Examples 16-20, wherein the encoding parameters further comprise a frames-per-second parameter of the video stream and the method further comprises: determining a bandwidth of the video channel and downgrading the frames-per-second parameter of the video stream when the bandwidth is below a predetermined threshold.

Example 22; the method of some or all of Examples 16-21, further comprising: modulating a frame rate sampling parameter of the encoding based at least in part on capacity of a CPU and/or GPU, of the selected remote device, available for encoding.

Example 23: a system comprising: a server configured to perform operations comprising: receiving a request issued from a user browser, the request comprising a request to start a remote session at a first location, using a remote device at a second location; selecting a remote device, from a plurality of remote devices at the second location; selecting a communication initiation server; and transmitting an identifier of the communication initiation server to a host, at the second location, the host coupled to the selected remote device at the second location; the host configured to perform operations comprising: transmitting the identifier of the communication initiation server to the selected remote device; connecting, via the communication initiation server, the browser and the selected remote device; exchanging, via the communication initiation server, parameters of a communication network between the browser and the selected remote device; establishing the communication network between the browser and the selected remote device, wherein establishing the communication network further comprises establishing a video channel between the browser and the remote device via the host; launching an application on the selected device, the launched application broadcasting a video stream of the display of the selected remote device; and transmitting the broadcast video stream, from the selected remote device to the host and from the host to the browser, via the video channel; and a web application executable in the browser and configured to perform operations comprising: generating a replica display of the selected remote device on the browser; and displaying the broadcast video stream in the replica display in the browser.

Example 24: the system of Example 23, wherein the host is further configured establish a data channel via the communication network between the browser and the selected remote device and the web application is further configured to capture user interactions with the replica display and transmit the user interactions, via the data channel to the selected remote device.

Example 25: the system of some or all of Examples 23 and 24, wherein the server is further configured to perform operations comprising: in response to the request to start the remote session, issuing a response to the browser, the response comprising an identifier of the selected communication initiation server and an identifier of the remote session, and wherein connecting, via the communication initiation server, further comprises: the browser and the selected remote device connecting to the selected communication initiation server, using the identifier of the remote session.

Example 26: the system of some or all of Examples 23-25, wherein the server is further configured to perform operations comprising: sending a response to the browser, the response comprising an identifier of the selected communication initiation server and an identifier of the remote session; sending a session parameter message to the host, at the second location, wherein the host is electrically connected to the selected remote device; and wherein the host is further configured to perform operations comprising: transmitting a message to the selected remote device, wherein the session parameter message and the message both comprise the identifier of the selected communication initiation server and the identifier of the remote session.

Example 27: the system of some or all of Examples 23-26, further comprising a communication module configured to encode the broadcast video stream based on one or more encoding parameters, and wherein the web application is configured to decode the received video stream and display the decoded video stream in the replica display in the browser.

Example 28: the system of some or all of Examples 23-27, wherein the encoding parameters further comprise a frames-per-second parameter of the video stream and the communication module is further configured to determine a bandwidth of the video channel and downgrade the frames-per-second parameter of the video stream when the bandwidth is below a predetermined threshold.

Example 29: the system of some or all of Examples 23-28, wherein the communication module is further configured to modulate a frame rate sampling parameter of the encoding based at least in part on capacity of a CPU and/or GPU, of the selected remote device, available for encoding.

Example 30: a non-transitory computer storage that stores executable program instructions that, when executed by one or more computing devices, configure the one or more computing devices to perform operations comprising: issuing, from a browser at a first location, a request to start a remote session at the first location, using a remote device at a second location;

receiving the request to start a session at a server; selecting, by the server, a remote device, from a plurality of remote devices at the second location; selecting, by the server, a communication initiation server; transmitting an identifier of the communication initiation server to a host, at the second location, the host coupled to the selected remote device at the second location; the host transmitting the identifier of the communication initiation server to the selected remote device; connecting, via the communication initiation server, the browser and the selected remote device; exchanging, via the communication initiation server, parameters of a communication network between the browser and the selected remote device; launching an application on the selected device, the launched application broadcasting a video stream of the display of the selected remote device; establishing the communication network between the browser and the selected remote device, wherein establishing the communication network further comprises establishing a video channel between the browser and the remote device via the host; generating a replica display of the selected remote device on the browser; transmitting the broadcast video stream, from the selected remote device to the host and from the host to the browser, via the video channel; and displaying the broadcast video stream in the replica display in the browser.

Example 31: the non-transitory computer storage of Example 30, wherein the operations further comprise: establishing a data channel via the communication network; capturing user interactions with the replica display; and transmitting the user interactions, via the data channel to the selected remote device.

Example 32: the non-transitory computer storage of some or all of Examples 30 and 31, wherein the operations further comprise: in response to the request to start the remote session, issuing a response to the browser, the response comprising an identifier of the selected communication initiation server and an identifier of the remote session, and wherein connecting, via the communication initiation server, further comprises: the browser and the selected remote device connecting to the selected communication initiation server, using the identifier of the remote session.

Example 33: the non-transitory computer storage of some or all of Examples 30-32, wherein the operations further comprise: sending a response to the browser, the response comprising an identifier of the selected communication initiation server and an identifier of the remote session; sending a session parameter message to the host, at the second location, wherein the host is electrically connected to the selected remote device; and transmitting, via the host, a message to the selected remote device, wherein the session parameter message and the message both comprise the identifier of the selected communication initiation server and the identifier of the remote session.

Example 34: the non-transitory computer storage of some or all of Examples 30-33, wherein the operations further comprise: encoding the broadcast video stream based on one or more encoding parameters; decoding, by the browser, the received video stream and displaying the decoded video stream in the replica display in the browser.

Example 35: the non-transitory computer storage of some or all of Examples 30-34, wherein the encoding parameters further comprise a frames-per-second parameter of the video stream and the operations further comprise: determining a bandwidth of the video channel and downgrading the frames-per-second parameter of the video stream when the bandwidth is below a predetermined threshold.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed is:

1. A method comprising:
    issuing, from a browser at a first location, a request to start a remote session at the first location, using a remote device at a second location;
    receiving the request to start the remote session at a server;
    selecting, by the server, the remote device, from a plurality of remote devices at the second location;
    selecting, by the server, a communication initiation server;
    transmitting an identifier of the communication initiation server to a host, at the second location, the host coupled to the selected remote device at the second location;
    the host transmitting the identifier of the communication initiation server to the selected remote device;
    connecting, via the communication initiation server, the browser and the selected remote device;
    exchanging, via the communication initiation server, parameters of a communication network between the browser and the selected remote device;
    launching an application on the selected remote device, the launched application broadcasting a video stream of the display of the selected remote device;
    establishing the communication network between the browser and the selected remote device, wherein establishing the communication network further comprises establishing a video channel between the browser and the selected remote device via the host;
    generating a replica display of the selected remote device on the browser;
    transmitting the broadcast video stream, from the selected remote device to the host and from the host to the browser, via the video channel; and
    displaying the broadcast video stream in the replica display in the browser.

2. The method of claim 1 further comprising:
    establishing a data channel via the communication network;
    capturing user interactions with the replica display; and
    transmitting the user interactions, via the data channel to the selected remote device.

3. The method of claim 1 further comprising:
    in response to the request to start the remote session, issuing a response to the browser, the response comprising an identifier of the selected communication initiation server and an identifier of the remote session, and wherein connecting, via the communication initiation server, further comprises:
    the browser and the selected remote device connecting to the selected communication initiation server, using the identifier of the remote session.

4. The method of claim 1, further comprising:
    sending a response to the browser, the response comprising an identifier of the selected communication initiation server and an identifier of the remote session;
    sending a session parameter message to the host, at the second location, wherein the host is electrically connected to the selected remote device; and
    transmitting, via the host, a message to the selected remote device, wherein the session parameter message and the message both comprise the identifier of the selected communication initiation server and the identifier of the remote session.

5. The method of claim 1, further comprising:
    encoding the broadcast video stream based on one or more encoding parameters;
    decoding, by the browser, the received video stream and displaying the decoded video stream in the replica display in the browser.

6. The method of claim 5, wherein the encoding parameters further comprise a frames-per-second parameter of the video stream and the method further comprises:
    determining a bandwidth of the video channel and downgrading the frames-per-second parameter of the video stream when the bandwidth is below a predetermined threshold.

7. The method of claim 5, further comprising: modulating a frame rate sampling parameter of the encoding based at least in part on capacity of a CPU and/or GPU, of the selected remote device, available for encoding.

8. A system comprising:
a server configured to perform operations comprising:
receiving a request issued from a user browser, the request comprising a request to start a remote session at a first location, using a remote device at a second location;
selecting the remote device, from a plurality of remote devices at the second location;
selecting a communication initiation server; and
transmitting an identifier of the communication initiation server to a host, at the second location, the host coupled to the selected remote device at the second location;
the host, comprising a processor configured to perform operations comprising:
transmitting the identifier of the communication initiation server to the selected remote device;
connecting, via the communication initiation server, the browser and the selected remote device;
exchanging, via the communication initiation server, parameters of a communication network between the browser and the selected remote device;
establishing the communication network between the browser and the selected remote device, wherein establishing the communication network further comprises establishing a video channel between the browser and the selected remote device via the host;
launching an application on the selected remote device, the launched application broadcasting a video stream of the display of the selected remote device; and
transmitting the broadcast video stream, from the selected remote device to the host and from the host to the browser, via the video channel; and
a web application executable in the browser and configured to perform operations comprising:
generating a replica display of the selected remote device on the browser; and
displaying the broadcast video stream in the replica display in the browser.

9. The system of claim 8, wherein the host is further configured to establish a data channel via the communication network between the browser and the selected remote device and the web application is further configured to capture user interactions with the replica display and transmit the user interactions, via the data channel to the selected remote device.

10. The system of claim 8, wherein the server is further configured to perform operations comprising:
in response to the request to start the remote session, issuing a response to the browser, the response comprising an identifier of the selected communication initiation server and an identifier of the remote session, and wherein connecting, via the communication initiation server, further comprises:
the browser and the selected remote device connecting to the selected communication initiation server, using the identifier of the remote session.

11. The system of claim 8, wherein the server is further configured to perform operations comprising:
sending a response to the browser, the response comprising an identifier of the selected communication initiation server and an identifier of the remote session;
sending a session parameter message to the host, at the second location, wherein the host is electrically connected to the selected remote device; and
wherein the host is further configured to perform operations comprising: transmitting a message to the selected remote device, wherein the session parameter message and the message both comprise the identifier of the selected communication initiation server and the identifier of the remote session.

12. The system of claim 8, further comprising a communication module, the communication module comprising a processor configured to encode the broadcast video stream based on one or more encoding parameters, and
wherein the web application is configured to decode the received video stream and display the decoded video stream in the replica display in the browser.

13. The system of claim 12, wherein the encoding parameters further comprise a frames-per-second parameter of the video stream and the communication module is further configured to determine a bandwidth of the video channel and downgrade the frames-per-second parameter of the video stream when the bandwidth is below a predetermined threshold.

14. The system of claim 12, wherein the communication module is further configured to modulate a frame rate sampling parameter of the encoding based at least in part on capacity of a CPU and/or GPU, of the selected remote device, available for encoding.

15. A non-transitory computer storage that stores executable program instructions that, when executed by one or more computing devices, configure the one or more computing devices to perform operations comprising:
issuing, from a browser at a first location, a request to start a remote session at the first location, using a remote device at a second location;
receiving the request to start the remote session at a server;
selecting, by the server, the remote device, from a plurality of remote devices at the second location;
selecting, by the server, a communication initiation server;
transmitting an identifier of the communication initiation server to a host, at the second location, the host coupled to the selected remote device at the second location;
the host transmitting the identifier of the communication initiation server to the selected remote device;
connecting, via the communication initiation server, the browser and the selected remote device;
exchanging, via the communication initiation server, parameters of a communication network between the browser and the selected remote device;
launching an application on the selected remote device, the launched application broadcasting a video stream of the display of the selected remote device;
establishing the communication network between the browser and the selected remote device, wherein establishing the communication network further comprises establishing a video channel between the browser and the selected remote device via the host;
generating a replica display of the selected remote device on the browser;
transmitting the broadcast video stream, from the selected remote device to the host and from the host to the browser, via the video channel; and
displaying the broadcast video stream in the replica display in the browser.

16. The non-transitory computer storage of claim 15, wherein the operations further comprise:
establishing a data channel via the communication network;
capturing user interactions with the replica display; and
transmitting the user interactions, via the data channel to the selected remote device.

17. The non-transitory computer storage of claim 15, wherein the operations further comprise:
in response to the request to start the remote session, issuing a response to the browser, the response comprising an identifier of the selected communication initiation server and an identifier of the remote session, and wherein connecting, via the communication initiation server, further comprises:
the browser and the selected remote device connecting to the selected communication initiation server, using the identifier of the remote session.

18. The non-transitory computer storage of claim 15, wherein the operations further comprise:
sending a response to the browser, the response comprising an identifier of the selected communication initiation server and an identifier of the remote session;
sending a session parameter message to the host, at the second location, wherein the host is electrically connected to the selected remote device; and
transmitting, via the host, a message to the selected remote device, wherein the session parameter message and the message both comprise the identifier of the selected communication initiation server and the identifier of the remote session.

19. The non-transitory computer storage of claim 15, wherein the operations further comprise:
encoding the broadcast video stream based on one or more encoding parameters;
decoding, by the browser, the received video stream and displaying the decoded video stream in the replica display in the browser.

20. The non-transitory computer storage of claim 19, wherein the encoding parameters further comprise a frames-per-second parameter of the video stream and the operations further comprise:
determining a bandwidth of the video channel and downgrading the frames-per-second parameter of the video stream when the bandwidth is below a predetermined threshold.

* * * * *